(12) United States Patent
Beck et al.

(10) Patent No.: US 6,474,629 B2
(45) Date of Patent: Nov. 5, 2002

(54) SUSPENSION SYSTEM FOR MOTOR VEHICLES

(75) Inventors: Hubert Beck; Dieter Eulenbach, both of Eitorf (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/827,478

(22) Filed: Apr. 5, 2001

(65) Prior Publication Data

US 2001/0033047 A1 Oct. 25, 2001

(30) Foreign Application Priority Data

Apr. 20, 2000 (DE) .......................... 100 19 532

(51) Int. Cl.[7] ............... B60G 17/044; B60G 17/08; F16F 9/32; F16F 9/34; F16F 9/50
(52) U.S. Cl. .................. 267/64.16; 188/266.3; 188/266.4; 188/322.2; 280/124.159
(58) Field of Search .................. 267/64.16, 64.17, 267/DIG. 1, DIG. 2, 64.15; 188/266.1, 266.2, 266.3, 266.4, 266.6, 318, 282.2, 322.2; 701/37, 38; 280/124.159, 124.1, 124.116, 6.157, 5.507, 5.515, 124.158, 6.159, 5.514, 5.501, 6.158, 6.152, 124.16, 5.508

(56) References Cited

U.S. PATENT DOCUMENTS

| 5,222,759 A | * | 6/1993 | Wanner et al. | |
| 5,392,882 A | * | 2/1995 | Mackovjak et al. | 188/299.1 |
| 2002/0030311 A1 | * | 3/2002 | Beck et al. | 267/64.11 |

FOREIGN PATENT DOCUMENTS

| DE | 19507874 | * | 9/1996 |
| DE | 19849222 | * | 5/2000 |
| DE | 10019532 | * | 10/2001 |

\* cited by examiner

Primary Examiner—Douglas C. Butler
(74) Attorney, Agent, or Firm—Cohen, Pontani, Lieberman & Pavane

(57) ABSTRACT

A suspension system for motor vehicles with level regulation for adjusting a predetermined height of the vehicle body includes at least one piston-cylinder unit with a work cylinder, a piston rod and a damping piston having damping valves. A pump is connected between an oil reservoir and the piston cylinder unit via corresponding inlet and outlet lines. The pump is driven by a drive unit and the level height is detected by a sensor which acts on the drive unit or on a regulating valve via evaluating electronics.

5 Claims, 1 Drawing Sheet

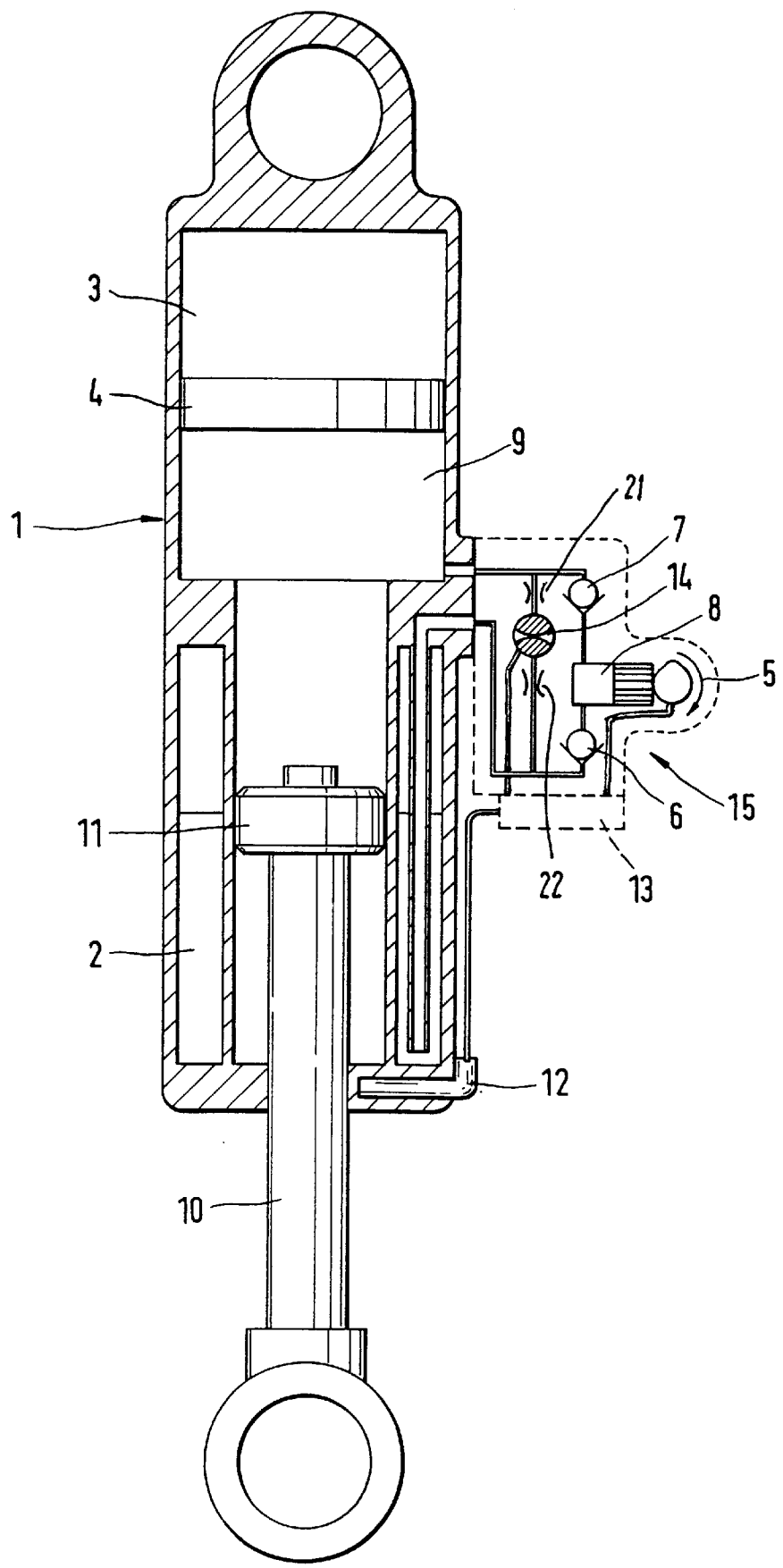

SUSPENSION SYSTEM FOR MOTOR VEHICLES

BACKGROUND OF THE INVENTION

1. Field of the Invention

The present invention relates to a suspension system for motor vehicles with level regulation for adjusting a predetermined height of the vehicle body including at least one piston-cylinder unit having a work cylinder, a piston rod and a damping piston with damping valves, and a pump for an oil reservoir and corresponding inlet and outlet lines between the oil reservoir and the piston-cylinder unit.

2. Description of the Related Art

Suspensions with automatic level regulation for motor vehicles are already known, for example, from German reference DE 32 12 433 A1 in which the suspension units of the vehicle wheels are supplied from a central oil reservoir via correspondingly open hydraulic lines. Actuating valves are required for connecting the suspension units with the oil reservoir and are supplied with an appropriate amount of oil from the oil reservoir by a central pump. A flow regulator and a height sensor act in the oil circuit when needed to adjust the vehicle body to an appropriate height. The pump is activated for adjusting the height. A disadvantage in a suspension unit of this type is that the hydraulic lines are needed for the forward and reverse flow and the pressureless oil reservoirs require maintenance in that the filling level of the damping medium must constantly be monitored. Further, suspension units of this type cannot be retrofitted in an existing vehicle.

SUMMARY OF THE INVENTION

It is an object of the present invention to provide a suspension system with level regulation which is sensed and controlled electrically and which can also be easily retrofitted in existing motor vehicles.

According to the present invention, the object is met by suspension system having a piston cylinder unit including a work cylinder, a piston rod and a damping piston having damping valves. A pump driven by a drive unit is arranged between an oil reservoir and the piston-cylinder unit via inlet and outlet lines, wherein the level height of the vehicle supported by the piston-cylinder unit is detected by a sensor which acts on the drive unit or on a regulating valve via evaluating electronics.

This embodiment allows the vehicle level to be adapted via a sensor and the evaluating electronics, wherein the vehicle body may be regulated either up or down.

The evaluating electronics may be integrated in the drive unit. A compact constructional unit may be provided in this way.

In yet another embodiment form, a regulating valve is integrated in the drive unit. Accordingly, an individual structural component part may be provided which can be flanged to piston-cylinder units which are close in series.

The sensor may be arranged as a component part of the piston-cylinder unit.

According to another embodiment, a throttle or choke is arranged in front of and/or after an outlet valve in the outlet line.

In another embodiment form, the sensor determines the position of the piston rod relative to a housing of the piston-cylinder unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

FIG. 1 is a longitudinal sectional view of a suspension system for motor vehicles with level regulation according to an embodiment of the present invention.

DETAILED DESCRIPTION OF THE PRESENTLY PREFERRED EMBODIMENTS

FIG. 1 shows a piston-cylinder unit 1 according to an embodiment of the present invention in which an oil reservoir 2 and a pneumatic or gas spring volume 3 are integrated. Oil and gas are separated in the gas spring volume 3 by a separating element 4. A pump 15 is arranged between the oil reservoir 2 and a high pressure area of the piston-cylinder unit 1. When a drive unit 5 of the pump 15 is switched on, a pump piston is set in axial movement by the rotating movement of a cam connected to the drive unit 5. A restoring force is exerted on the pump piston via a spring.

The pump piston draws oil from the oil reservoir 2 to a pump space 8 and delivers the oil from the pump space 8 to a high-pressure area 9 of the piston-cylinder unit 1 via an inlet valve 6 and an outlet valve 7. The gas spring volume 3 is gradually compressed and accordingly acts on the end face of the piston rod 10 during operation of the drive unit 5. As long as the drive unit 5 is operating, the piston rod 10 is continuously pushed outward until a predetermined body height of a vehicle supported by the piston-cylinder unit 1 is reached. The drive unit 5 is switched off via a path sensor 12 when the predetermined body height is reached. The telescoping or extension force of the piston rod 10 may be reduced by actuating a regulating valve 14, e.g., this is the case when the vehicle is uploaded. The path sensor 12 is connected to evaluating electronics 13 which are connected for controlling the drive unit 5 and the regulating valve 14 in response to signals from the path sensor 12.

While the vehicle is being driven, a damping piston 11 provides for the damping of the vehicle with its damping valves which are known from the prior art.

The pump 15, the drive unit 5, the regulating valve 14 and the evaluating electronics 13 are integrated in a constructional unit, so that it is only necessary to arrange the sensor 12 at a suitable location via an electric connection. In FIG. 1, the sensor 12 is arranged in a housing of the piston-cylinder unit 1 so that this position of the piston-cylinder unit 10 may be detected.

The sensor 12 sends the appropriate signal for the desired level height via the evaluating electronics 13 to the drive unit 5 and/or the regulating valve 14, so that the body of the vehicle may be leveled.

To influence the lowering behavior of the vehicle body, a choke 21, 22 may be arranged before and/or after the regulating valve 14 so that an abrupt lowering of the vehicle body is prevented.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A suspension system for motor vehicles with level regulation for adjusting a height of a vehicle body, comprising:

at least one piston-cylinder unit with a work cylinder, a piston rod axially movably arranged in said work cylinder, and a damping piston connected to said piston rod and having damping valves;

an oil reservoir;

a regulating valve arranged between said oil reservoir and said piston-cylinder unit;

a pump arranged between said oil reservoir and said piston-cylinder unit via corresponding inlet and outlet lines parallel to said regulating valve, said pump comprising a drive unit for driving said pump; and a sensor connected to evaluating electronics, said sensor being arranged for detecting a level height of said piston-cylinder unit and said evaluating electronics operatively connected to said sensor and at least one of said drive unit and said regulating valve for actuating said at least one of said drive unit and said regulating valve in response to said sensor, wherein said evaluating electronics and said regulating valve are integrated with said drive unit as a single construction unit that is mounted on said work cylinder.

2. The suspension system of claim 1, wherein said sensor is a component part of said piston-cylinder unit.

3. The suspension system of claim 2, wherein said sensor determines a position of said piston rod relative to a housing of said piston-cylinder unit.

4. The suspension system of claim 1, further comprising a choke arranged in front of said regulating valve.

5. The suspension system of claim 1, further comprising a choke arranged in after said regulating valve.

* * * * *